(12) United States Patent
Freker

(10) Patent No.: US 6,442,645 B1
(45) Date of Patent: Aug. 27, 2002

(54) PRE-DECODE CONDITIONAL COMMAND GENERATION FOR REDUCED SDRAM CYCLE LATENCY

(75) Inventor: David E. Freker, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/205,447

(22) Filed: Dec. 4, 1998

(51) Int. Cl.[7] .............................................. G06F 12/00
(52) U.S. Cl. .................... 711/105; 365/230.06; 365/239
(58) Field of Search ...................... 711/105; 365/230.06, 365/239

(56) References Cited

U.S. PATENT DOCUMENTS

| | | | | |
|---|---|---|---|---|
| 4,236,205 A | * | 11/1980 | Kindseth et al. | ............. 711/137 |
| 4,429,374 A | * | 1/1984 | Tanimura | ............... 365/230.06 |
| 5,485,589 A | * | 1/1996 | Kocis et al. | ................ 711/213 |
| 5,691,956 A | * | 11/1997 | Chang et al. | ............... 365/239 |

* cited by examiner

Primary Examiner—Do Hyun Yoo
Assistant Examiner—Mehdi Namazi
(74) Attorney, Agent, or Firm—Blakely, Sokoloff, Taylor & Zafman LLP

(57) ABSTRACT

A method and apparatus for reducing the latency of a cycle initiated by a bus-mastering agent to a memory array is described. The method and corresponding apparatus involves partially decoding a current memory cycle to generate intermediate signals and providing one or more "safe" indicator signals indicating the status of a previous memory cycle. A circuit receives the intermediate signals and the one or more safe indicator signals, and determines whether it is safe to issue a chip select to the memory array, notwithstanding the fact that the command to be issued to the memory array is not yet known. If the cycle is a page-hit, then no further commands or chip select signals are required for the balance of the memory cycle. If the cycle is a row-miss or page-miss, further chip select assertions are required and the responsibility to assert the chip select signal is transferred from the device to a finite state machine.

16 Claims, 10 Drawing Sheets

PRE-DECODE CONDITIONAL COMMAND GENERATION FOR REDUCED SDRAM CYCLE LATENCY

BACKGROUND OF THE INVENTION

1. Field of the Invention

The present invention relates generally to memory controllers, and specifically, to a method and apparatus for improving the performance of SDRAM-based memory subsystems by reducing, in most cases, the latency of a cycle from any bus-mastering agent to memory.

2. Background Information

Memory controllers provide an interface between one or more bus masters and a memory subsystem (e.g., synchronous dynamic random access memory, "SDRAM" array). A bus master is an electronic device that initiates a transaction to a destination unit. Such bus masters include, for example, the host processor, a graphics device, and an input/output device, to name a few. The bus masters randomly issue requests to the SDRAM array. These requests typically pass through the memory controller in a serial fashion.

Current memory controllers fully decode an incoming address and based on this complete decode, determine the type of command that is to be issued to the SDRAM array, and when it is safe to issue such command. This complete decode is time consuming. Waiting for its completion typically results in delaying the assertion of a command to the SDRAM array. The information decoded includes the row and bank a cycle is targeting, the page-hit, page-miss, and row-miss statuses, and whether the cycle is to the same row and/or same bank as the previous cycle. Based on this complete decode, the memory controller generates the appropriate commands on the row address strobe, column address strobe, and write enable pins. In addition, the memory controller drives the appropriate row or column addresses on the memory address pins, and then asserts a signal on the chip select pin for the physical row of memory that is addressed. In high frequency, large memory systems, the above-mentioned decode can take two or more clocks to complete before the signal on the chip select pin can be asserted. This is time consuming, especially since millions of such decodes may occur in a second.

Accordingly, there is a need in the technology for a method and apparatus for reducing SDRAM cycle latency.

SUMMARY OF THE INVENTION

The present invention comprises a method and apparatus for reducing latency of a cycle initiated by a bus-mastering agent to memory. In one embodiment, the method includes receiving a memory request, partially decoding the memory request, sampling one or more safe indicator signals, and causing a chip select signal to be asserted without knowing a cycle type of the memory request, responsive to the partial decode and the one or more safe indicator signals.

DETAILED DESCRIPTION

The present invention comprises a method and apparatus for reducing the latency of a cycle initiated by a bus-mastering agent or device to memory. The method and apparatus involves partially decoding a current memory cycle to generate intermediate signals and providing one or more "safe" indicator signals indicating the status of a previous memory cycle. A circuit receives the intermediate signals and the one or more safe indicator signals, and determines whether it is safe to issue a chip select to the memory array, notwithstanding the fact that the command to be issued to the memory array is not yet known. The page-hit, page-miss, or row-miss decode completes too late for any finite state machines to consume the result and make a decision on issuing a command. Thus, this initial command is issued without any finite state machine ("FSM") involvement. The path is purely combinatorial. In the following clock after the command is issued on the command bus, a chip select is asserted and the state machines sample the complete decode to determine what type of command was issued. If the cycle is a page-hit, then no further commands or chip select signals are required for the balance of the memory cycle. If the cycle is a row-miss or page-miss, further chip select assertions are required and the responsibility to assert the chip select signal is transferred from the device to a finite state machine.

Figure 1:
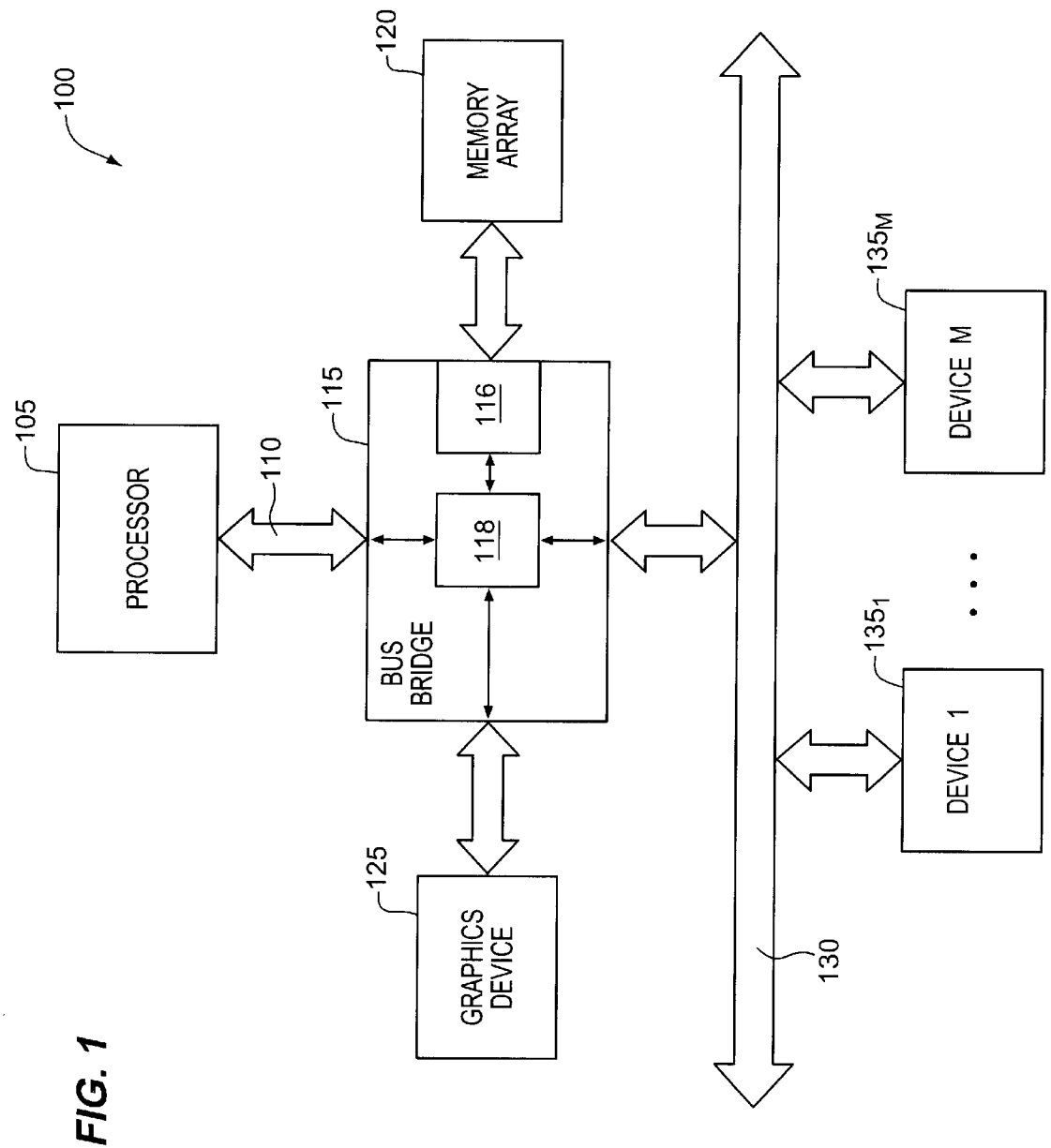
FIG. 1 illustrates an exemplary block diagram of a computer system suitable for use with the present invention.

FIG. 1 illustrates an exemplary block diagram of a computer system 100 suitable for use with the present invention. The computer system 100 includes a processor 105 coupled to a bus bridge 115 by way of host bus 110. The processor 105 represents a microcontroller or a central processing unit of any type of architecture, such as a CISC, RISC, VLIW, or hybrid architecture. In addition, the processor 105 could be implemented on one or more chips. The bus bridge 115 is coupled to memory array 120, a graphics device 125 by way of an Accelerated Graphics Port, and one or more devices $135_1$–$135_M$ (e.g., a network interface card, a SCSI controller card, etc.) on a secondary bus 130 (where "M" is a positive whole number). The bus bridge 115 includes a memory controller 116 coupled to the memory array 120 (e.g., dynamic random access memory "DRAM", static RAM "SRAM", etc.), and an interface device 118 which collects and prioritizes requests, destined to the memory array 120, from other busses, and funnels the requests to the memory controller 116. The bus bridge 115 is also responsible for bridging processor transactions to the memory array 120, secondary bus 130, or graphics device 125. The bus bridge 115 also bridges graphics device 125 transactions or mastered transactions on the secondary bus 130 to the memory array 120 while initiating processor cache snoop cycles. The secondary bus 130 represents one or more busses (e.g., PCI, ISA, X-Bus, EISA, VESA, etc.) and bridges (also termed as bus controllers). While this embodiment is described in relation to a single processor computer system, the invention could be implemented in a multi-processor computer system. In addition, while this embodiment is described in relation to a 64-bit computer system, the invention is not limited to a 64-bit computer system.

As discussed herein, a "computer system" is a product including circuitry capable of processing data. The computer system may include, but is not limited or restricted to, a conventional computer (e.g., laptop, desktop, palmtop, server, mainframe, etc.), hard copy equipment (e.g., printer, plotter, scanner, fax machine, etc.), banking equipment (e.g., an automated teller machine), wireless communication equipment, and the like.

Figure 2:
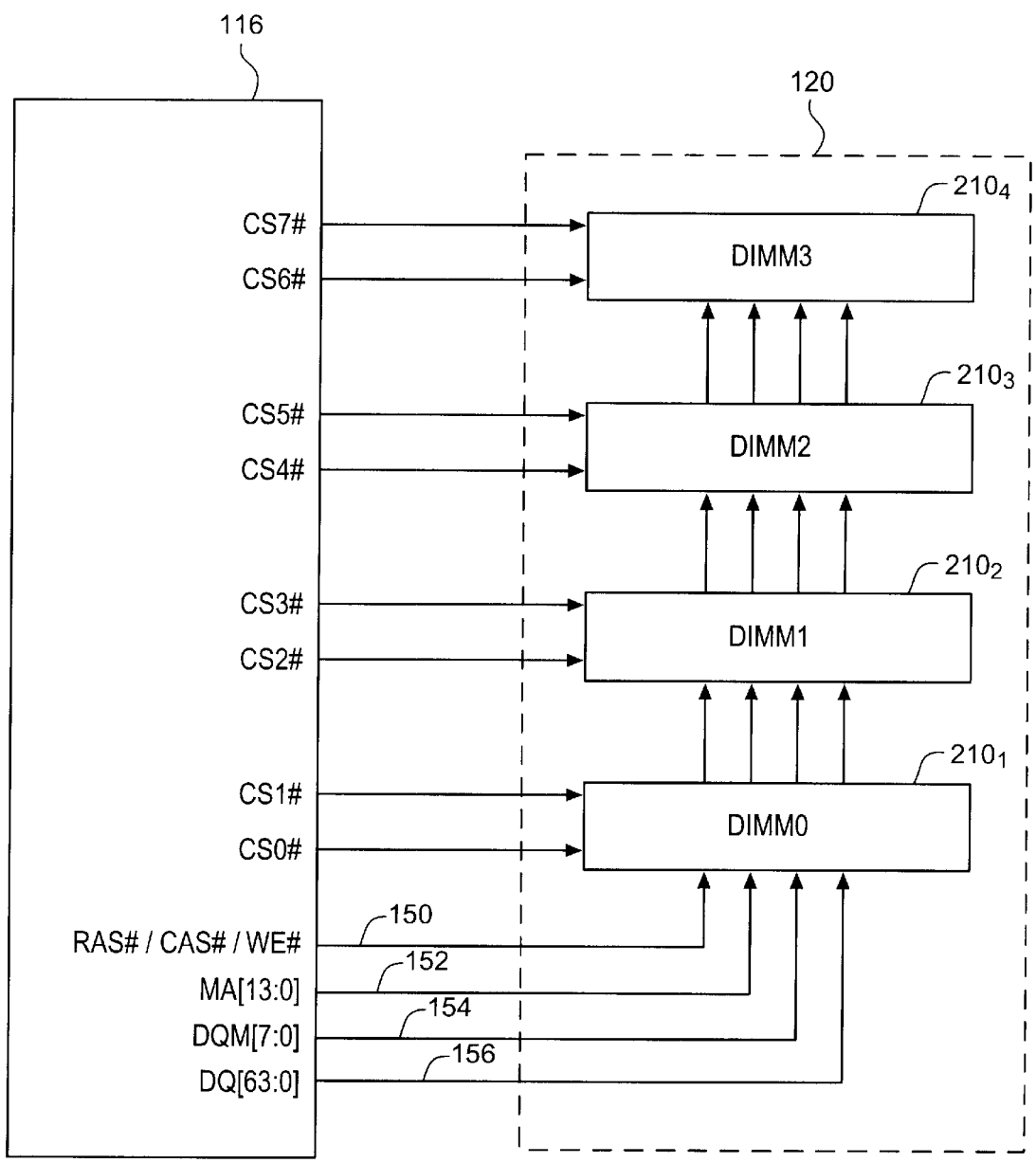
FIG. 2 illustrates an exemplary arrangement of the memory array and the signals coupled between the memory array and the memory controller of FIG. 1 according to one embodiment of the present invention.

FIG. 2 illustrates an exemplary arrangement of the memory array 120 and the signals coupled between the memory array 120 and the memory controller 116 of FIG. 1 according to one embodiment of the present invention. In the embodiment of FIG. 2, the memory array 120 includes dual in-line memory module ("DIMM") devices $210_1$–$210_4$, each of which includes two physical rows of memory. The memory controller 116 generates eight chip select signals CS0#–CS7# divided up into four pairs (CS0/1#, CS2/3#, CS4/5#, and CS6/7#), where the four pairs of chip select signals are coupled to the respective four DIMM devices $210_1$–$210_4$. Only one chip select signal may be active at any one time to select one of the eight physical rows of memory. The memory controller 116 also generates row address strobe (RAS#), column address strobe (CAS#), and write enable (WE#) signals on signal lines 150 (the symbol "#" referring to an active low signal), multiplexed address signals (MA) on address bus 152, DQM signals on signal lines 154, and data signals (DQ) on data bus 156. The RAS#/CAS#/WE# signals indicate the type of the memory access. The signal lines 150 are hereinafter referred to as the "command bus". The data bus 156 is sixth-four bits wide, but may be any size. The row and column addresses are multiplexed on the address bus 152 during different clock cycles. The DQM signals control the data output buffers of the physical rows of memory in read mode, and mask the data from being written to the memory array in write mode. Note that the RAS#/CAS#/WE#, MA, DQM, and DQ signals are coupled to each of the DIMM devices $210_1$–$210_4$. More than one copy of such signals may be generated by the memory controller 116 to meet the fan-out requirements of the system.

It is to be appreciated that a different number of DIMM devices may be used and each DIMM device may include a different number of physical rows of memory (e.g., one) without departing from the spirit and scope of the present invention. Each physical row of memory may contain one or more memory chips in various arrangements. For example, each physical row of memory may contain eight, 2MX8 chips, providing a 2MX64 physical row (16 Megabytes). The "PC SDRAM Specification", Version 1.63, Published in October of 1998 by Intel Corporation of Santa Clara, Calif. provides examples of various SDRAM memory array configurations. The physical rows of memory are sequential and do not have to be the same size. For example, if physical row one is 16 Megabytes ("MBs") and physical row two is 8 MBs, then physical row one is from 0 to 16 MBs−1 and physical row two is from 16 to 24 MBs−1. In addition, each physical row of memory may be divided into two, four, or more banks of memory. For discussion purposes, each physical row of memory is divided up into four banks.

There are a variety of types of cycles that can be generated by the memory controller 116 to the memory array 120, three of which are most prevalent and of interest to the present invention. These three types of cycles include row-miss, page-miss, and page-hit. For discussion purposes, the three types of cycles will be described with respect to a memory read cycle.

Figure 3A:
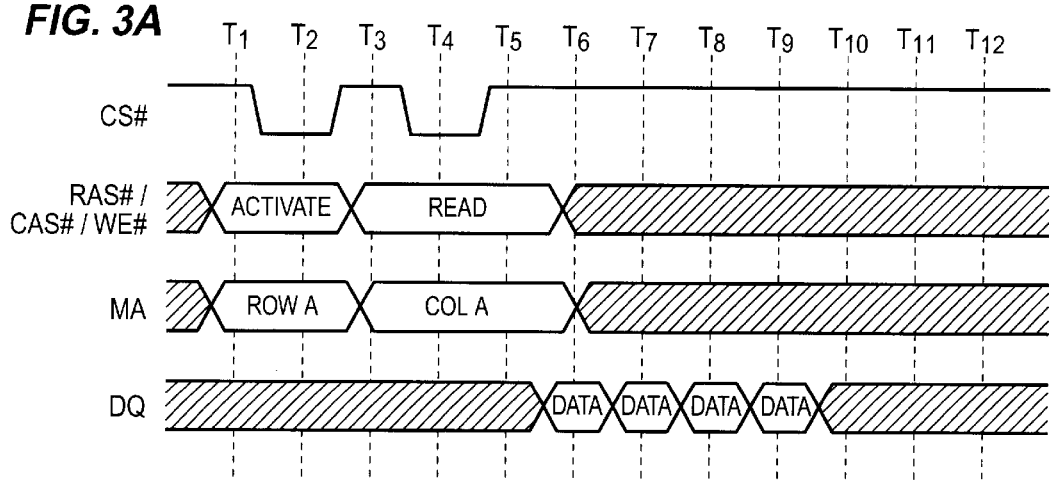
FIGS. 3A through 3C illustrate timing diagrams of one embodiment of a row-miss, page-miss, and page-hit cycles.

FIG. 3A illustrates a timing diagram of one embodiment of a row-miss cycle. In a row-miss cycle, the row address is strobed in a first cycle and the column address is strobed in a subsequent cycle. Referring to FIG. 3A, at some time before T2, an ACTIVATE command is driven on the command bus, a valid row address (ROWA) is driven on the MA bus, and CS# is asserted. An ACTIVATE command occurs when RAS# is active (low), and CAS# and WE# are inactive (high). At time T2, with CS# active, the row address is strobed into the memory device. Thereafter, CS# goes inactive. No data transfer occurs at this clock. At some time before T4, a READ command is driven on the command bus, a valid column address (COLA) is driven on the MA bus, and CS# is again asserted. At time T4, with CS# active, the column address is strobed into the memory device. In T5, data is driven on the DQ bus by the selected physical row of memory. Up to four consecutive quadwords of data are read by the memory controller 116. Four quadwords amount to 32 bytes of data, which is a cache line of data for the Intel® Pentium® and Pentium® II processors. More or less data may be read depending on the amount of data requested and/or the implementation.

Figure 3B:
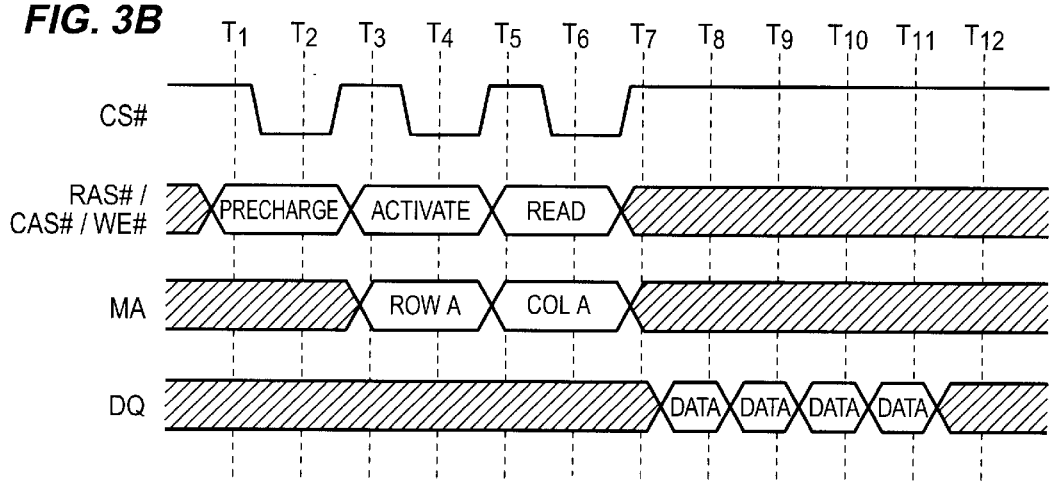

FIG. 3B illustrates a timing diagram of one embodiment of a page-miss cycle. In the row-miss cycle in FIG. 3A, the access to memory was to a closed page. Once the row-miss cycle completed, the page is left open. Each bank in each physical row of memory may have one page open. With four banks per physical row, up to four pages may be open per row. A page-miss cycle occurs when there is an open page in a bank of memory and a subsequent access is to a different page in the same bank of memory. In such a situation, the open page must be closed before the new page can be opened. This process involves issuing a PRECHARGE command on the command bus. Referring to FIG. 3B, at some time before T2, a PRECHARGE command is driven on the command bus, and CS# is asserted. A PRECHARGE command occurs when both RAS# and WE# are active (low), and CAS# is inactive (high). At time T2, with CS# active, the selected physical row of memory detects the PRECHARGE command and closes the current open page. Prior to T4, an ACTIVATE command is driven on the command bus and CS# is again asserted. At T4, the new row address is strobed in the selected memory device. At time T6, with a READ command driven on the command bus and CS# again asserted, the column address is strobed in the memory device. A clock later, beginning at time T7, four quadwords of data in four consecutive clock cycles are driven on the DQ bus by the selected memory device.

Figure 3C:
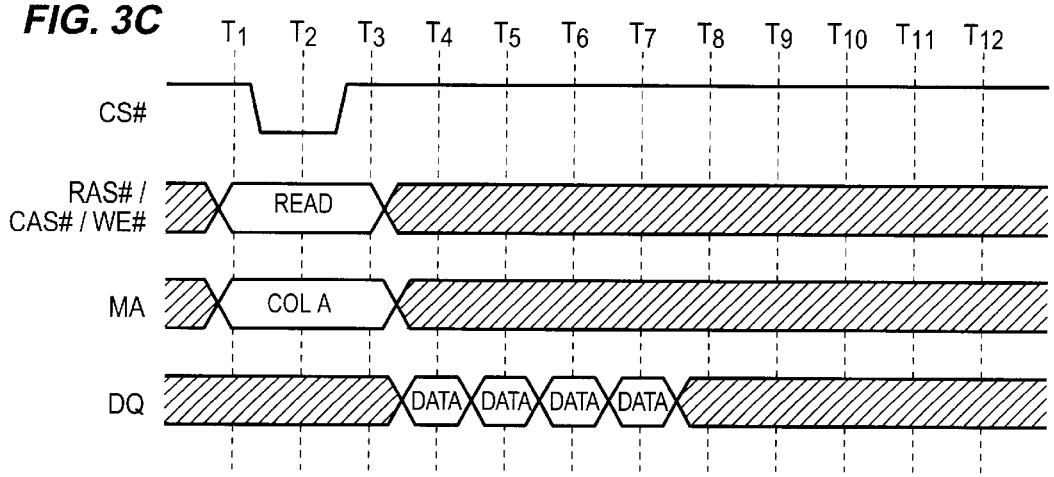

FIG. 3C illustrates a timing diagram of one embodiment of a page-hit cycle. A page-hit occurs when there is an open page in a bank of memory and a subsequent access is to the same open page in the bank. In this case, only the column address is needed, since the row address, corresponding to the page, is already in the memory device. Referring to FIG. 3C, prior to T2, a READ command is driven on the command bus, a column address is driven on the MA bus, and CS# is asserted. At time T2, with CS# active, the column address is strobed into the memory device. A clock later, beginning at time T3, data is driven on the DQ bus.

Figure 4A:
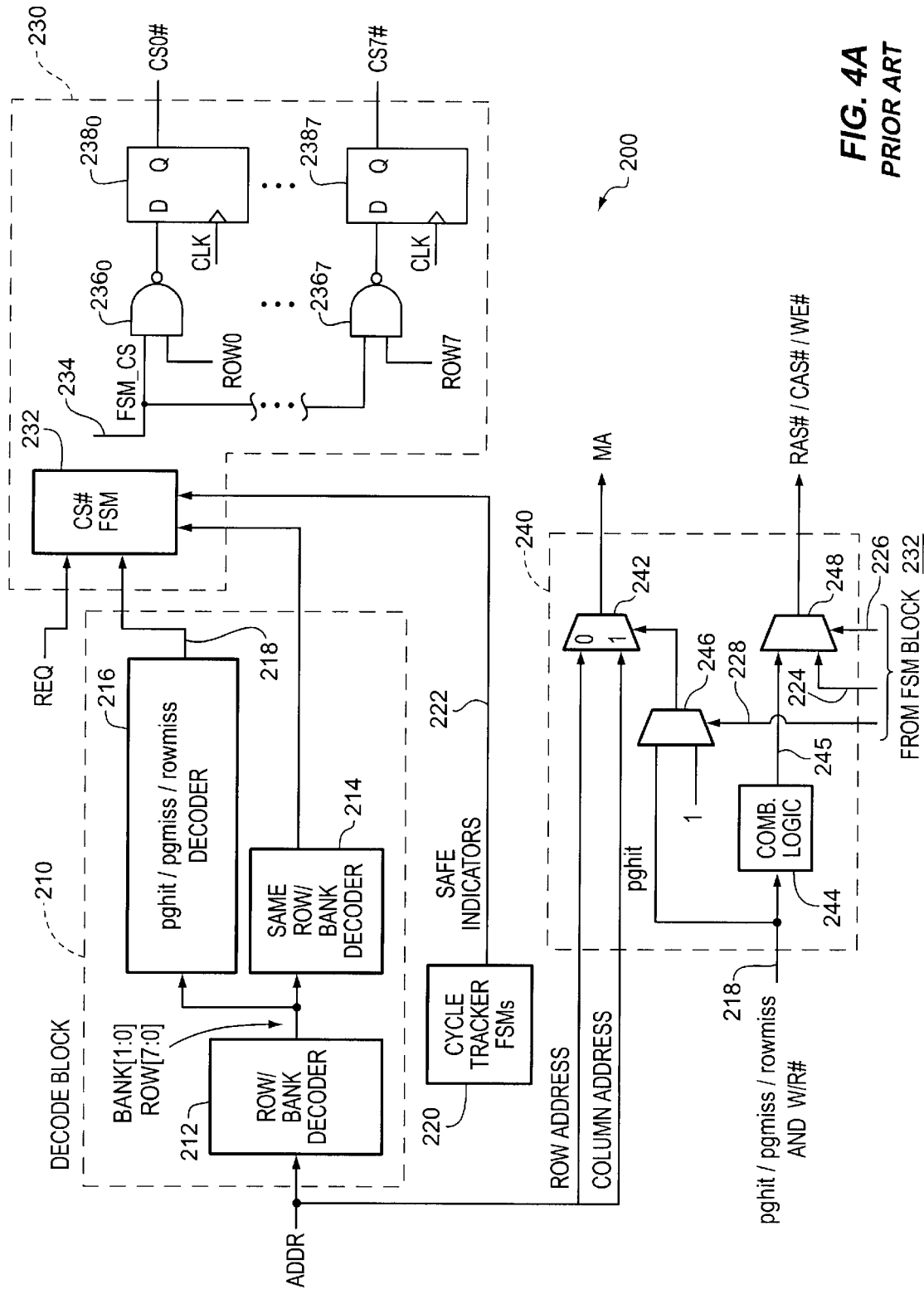
FIG. 4A illustrates a block diagram of a conventional memory controller.
Figure 4B:
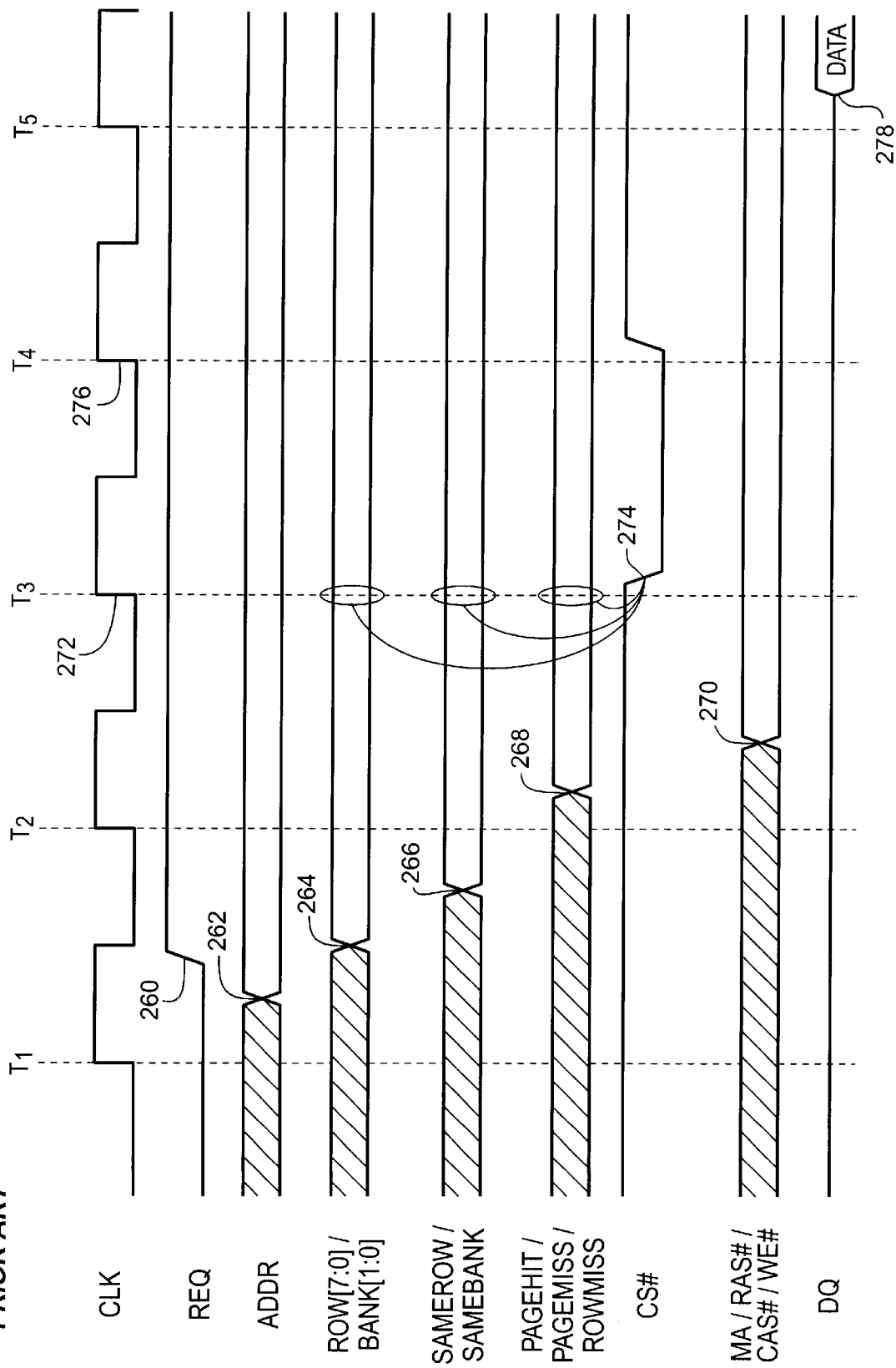
FIG. 4B illustrates a timing diagram of the signals associated with the conventional memory controller shown in FIG. 4A.

FIG. 4A illustrates a block diagram of a conventional memory controller 200. FIG. 4B illustrates a timing diagram of the signals shown in FIG. 4A. Referring to FIGS. 4A and 4B, the memory controller 200 includes a decode block 210, cycle tracker FSMs block 220, chip-select generation block 230, and address/command generation block 240. The decode block 210 includes a row/bank ("RB") decoder 212, a same-row/same-bank ("SS") decoder 214, and a page-hit/page-miss/row-miss ("PPR") decoder 216. At time 260, the REQ signal is asserted (e.g., by the interface device 118 of FIG. 1) indicating the start of a new cycle. At about the same time (time 262), the RB decoder 212 receives a valid address on the address bus ADDR. In one embodiment, the address bus is 32 bits wide, although other address bit widths may be used. The RB decoder 212 decodes a portion of the address and provides eight row outputs [7:0] one of which is asserted to indicate the physical row of memory that is addressed, and two bank outputs [1:0] indicating the bank (one of four banks) within the physical row that is addressed. This occurs at time 264.

The RB decoder 212 is coupled to the SS decoder 214 and the PPR decoder 216. The SS decoder 214 receives the row outputs [7:0] and bank outputs [1:0] and has a register contained therein which stores the row and bank outputs of the immediately previous access to the memory array 120 (FIG. 2). The row and bank outputs for the current cycle are compared with the row and bank outputs for the previous cycle. The SS decoder 214 generates two output signals, namely, SAMEROW and SAMEBANK, which become valid at time 266 (within T1). If the current memory access is to the same row and bank as the previous memory access, then both signals are active. If the current access is to the same row but to a different bank from the previous memory access, then SAMEROW is active and SAMEBANK is inactive. On the other hand, if the access is to a different row, then SAMEROW is inactive and SAMEBANK is a "don't care".

The PPR decoder 216 includes a plurality of registers which keep track of the pages open in the memory array 120. For a memory array having eight physical rows of memory, and four banks per physical row, thirty-two pages of memory may be open at the same time. Thus, at least thirty-two registers are contained within the PPR decoder 216. Based on the row outputs [7:0] and bank outputs [1:0], the PPR decoder 216 determines whether there is a row-miss, page-miss, or page-hit, and, responsive thereto, asserts/de-asserts the ROWMISS, PAGEMISS, and PAGE-HIT signals. These signals become valid at time 268, which is in T2.

The cycle tracker FSMs 220 monitor the bus activity and generate a number of "safe" indicator signals on signal lines 222 to ensure valid completion of the data phase of a cycle. The operation of the cycle tracker FSMs 232 are described in more detail with respect to FIGS. 5A and 5B. The outputs of the PPR decoder 216, SS decoder 214, and cycle tracker FSMs 220 are coupled to a FSM block 232 of the chip-select generation block 230. The FSM block 232 is responsible for tracking the type of bus cycle and generating a chip select signal FSM_CS on signal line 234 at the appropriate times. For example, as described with respect to FIG. 3B, if the current access is a page-miss cycle, the FSM block 232 is responsible for asserting FSM_CS three times one for each of the PRECHARGE, ACTIVATE, and READ or WRITE commands. The signal line 234 is coupled to one input of NAND gates $236_0$–$236_7$. The row outputs [7:0] of the RB decoder 212 are coupled to second inputs of the respective NAND gates $236_0$–$236_7$. Thus, only one of the NAND gate outputs will be active (low) at any one time. The NAND gates $236_0$–$236_7$ are coupled to respective D flip-flops $238_0$–$238_7$. The outputs of the D flip-flops are the chip select signals CS0#-CS7#. Thus, when the PAGEHIT, PAGEMISS, and ROWMISS signals become active (in T2), if the "safe" indicator signal corresponding to the cycle type indicates that it is safe to issue a cycle, the FSM block 232 will assert FSM_CS during T2. As a result, one of the D flip-flop inputs goes low in T2, causing the corresponding chip select signal to be driven low in T3.

The ROWMISS, PAGEMISS, and PAGEHIT outputs of the PPR decoder 216 are coupled to a combination logic block 244 of address/command generation block 240. Also coupled to block 244 is the write/read (W/R#) input signal indicating whether the cycle is a write or a read. The block 244 initially generates the RAS#/CAS#/WE# signals on signal lines 245, which are coupled to a first input of multiplexer ("mux") 248. The FSM block 232 generates RAS#/CAS#/WE# signals for subsequent commands, if any, on signals lines 244, which are coupled to second inputs of the mux 248. The FSM block 232 also controls the mux 248 by way of signal line 226. During a first command of a memory cycle, the FSM block 232 controls the mux 248, allowing the block 244 to drive the RAS#/CAS#/WE# signals on the command bus. During subsequent commands of the memory cycle, if any, the FSM block 232 drives the RAS#/CAS#/WE# signals on the command bus.

The row address lines and column address lines of the ADDR bus are coupled to first and second inputs, respectively, of mux 242. The output of the mux 242 is the MA bus. The PAGEHIT output of the PPR decoder 216 is coupled to a first input of mux 246, while a second input of mux 246 is pulled high. The output of the mux 246 is coupled to the control terminal of the mux 242. The FSM block 232 generates a signal on signal line 228, which is coupled to the control terminal of mux 246 for controlling the same. Thus, during a first command of a memory cycle, the FSM block 232, by way of signal line 228, controls the mux 246, allowing the PAGEHIT signal to control the mux 242. If there is a page-hit (PAGEHIT=1), then the column address is driven on the MA bus. If there is a row-miss (PAGEHIT=0), then the row address is driven on the MA bus and an ACTIVATE command is driven on the command bus. Thereafter, the FSM block 232 toggles the mux 246, forcing the column address to be driven on the MA bus during a READ or WRITE command. If the first command is a page-miss (PAGEHIT=0), then the row address is driven on the MA bus, and a PRECHARGE command is driven on the command bus. During the ACTIVATE command of the page-miss cycle, the FSM block 232 does not toggle the mux 246 (PAGEHIT is still 0), forcing the row address on the MA bus. During the READ or WRITE command of the page-miss cycle, the FSM block 232 toggles the mux 246, forcing the column address to be driven on the MA bus.

Continuing to refer to FIGS. 4A and 4B, the RAS#/CAS#/WE# and MA signals, at the earliest, become valid at time 270 (in T2), which is a full decode of the cycle. At time 272 (rising edge of T3), the flip-flops $238_0$–$238_7$ are clocked, and at time 274 one of the chip-select signals is driven active (low). If the cycle is a row-miss or a page-miss, then an ACTIVATE command or a PRECHARGE command, respectively, is strobed in. On the other hand, if the cycle is a page-hit, then a READ or WRITE command is strobed in. Assuming the command is a page-hit, the column address is strobed in the appropriate memory device at time 276 (when the chip select is strobed in). Then, at time 278 valid data is driven on the DQ bus by the memory device for consumption by the memory controller 116. As can be seen, it takes at least 5 clock cycles, for a page-hit cycle, before the first quadword of data is available for consumption.

Figure 5A:
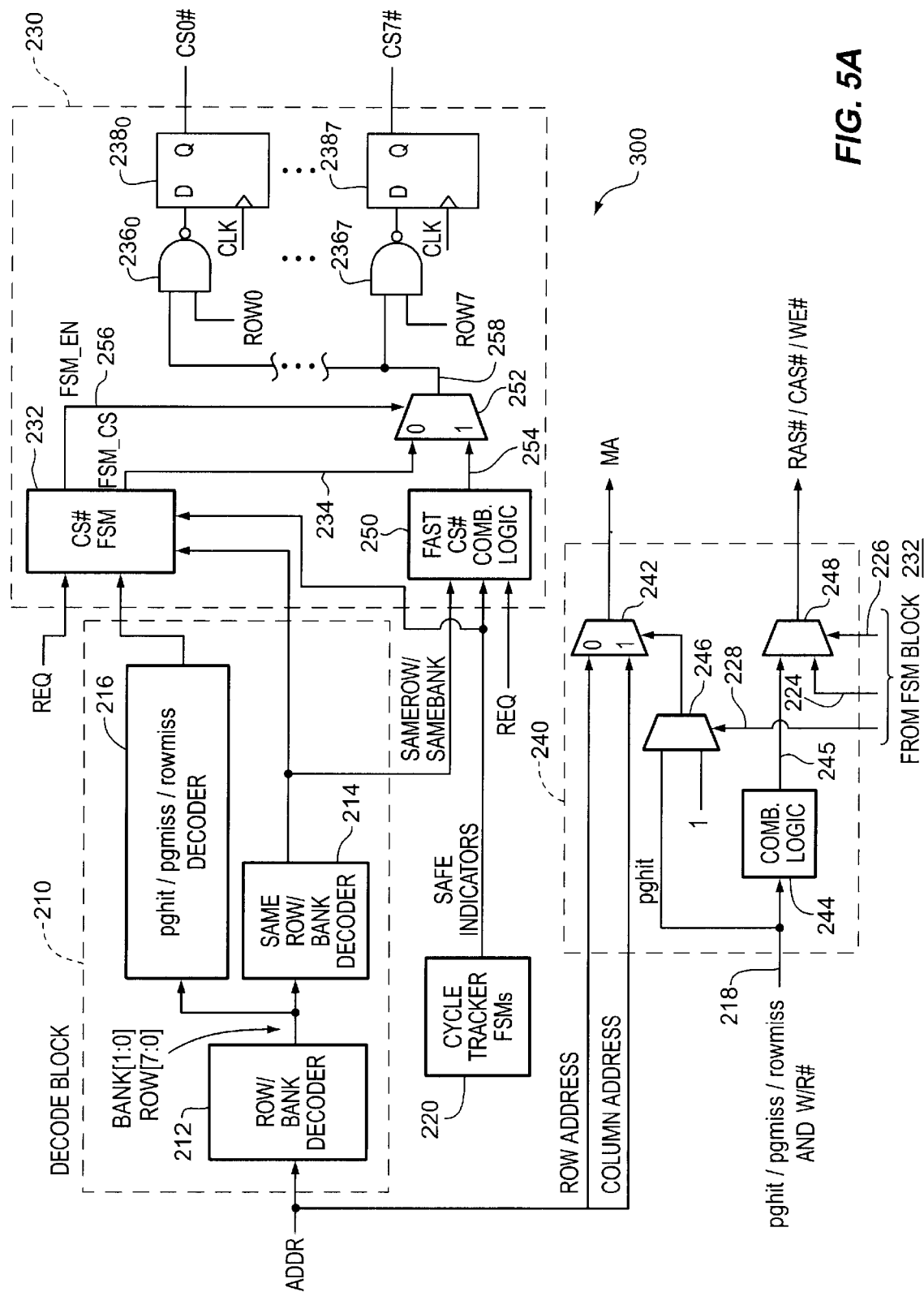
FIG. 5A illustrates a block diagram of a memory controller according to one embodiment of the present invention.
Figure 5B:
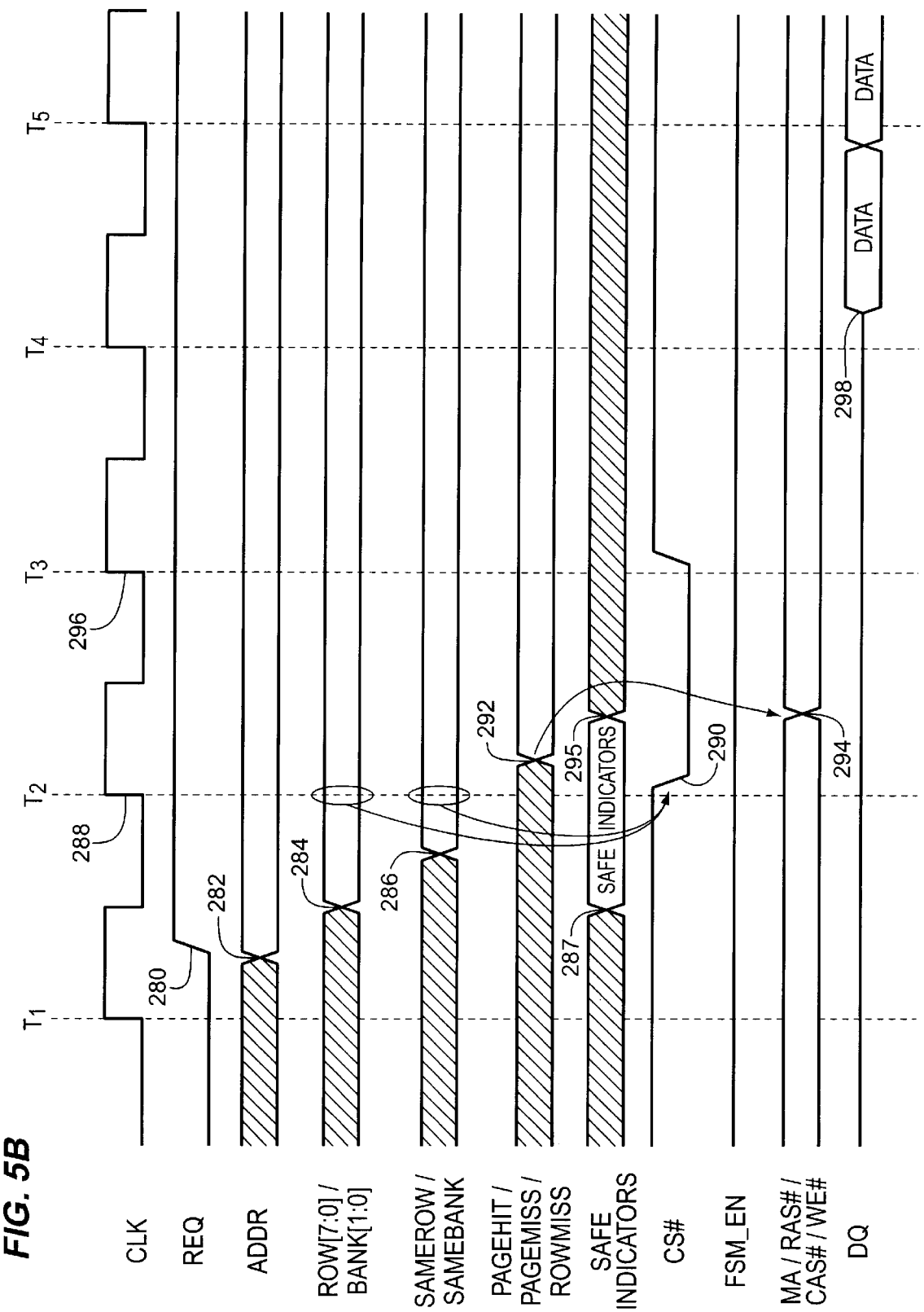
FIG. 5B illustrates a timing diagram of the signals associated with the memory controller of the present invention.

FIG. 5A illustrates a block diagram of a memory controller 300 according to one embodiment of the present invention. FIG. 5B illustrates a timing diagram of the signals shown in FIG. 5A. The same blocks used in both FIGS. 4A and 5A are labeled with the same reference number. Referring to FIG. 5A, the memory controller 300 (shown as 116 in FIG. 1) of the present invention includes most of the blocks shown in the memory controller of FIG. 4A. The memory controller 300 further includes a fast, chip-select combinatorial logic block 250 and a mux 252. The SAMEROW and SAMEBANK outputs of the SS decoder 214 and the "safe" indicator signals of the cycle tracker FSMs 220, in addition to being coupled to the FSM block 232, are coupled to the logic block 250. The logic block 250 generates an EARLY_CS signal on signal line 254 which is coupled to a first input of the mux 252. The FSM block 232 generates the FSM_CS signal on signal line 234, which is coupled to the other input of the mux 252. The FSM block 232 also generates a FSM_EN signal on signal line 256, which is coupled to a control terminal of the mux 252 for controlling the same. The mux 252 output signal line 258 is coupled to one input of NAND gates $236_0$–$236_7$.

Referring now to FIGS. 5A and 5B, the beginning of a cycle commences during T1, where the REQ signal is asserted at time 280 and a valid address ADDR is driven on the address bus. The RB decoder 212 decodes a portion of the address ADDR, and generates row outputs [7:0] and bank outputs [1:0] at time 284. The SAMEROW and SAMBANK output signals at the output of the SS decoder 214 become valid at time 286, which is still within T1. This is a partial decode of the cycle since it is not yet known whether the cycle is a page-hit, page-miss, or row-miss, and therefore it is not known what command is to be issued on the command bus. The page-hit, page-miss, or row-miss information is not known until time 292, which is well into the second clock T2. Thus, with the prior art technique, the inputs of the D flip-flops $238_0$–$238_7$ become settled shortly after the page-hit, page-miss, and row-miss signals become valid (in T2). At the rising edge of T3 (see FIG. 4B, time 272), the D flip-flops $238_0$–$238_7$ are clocked, and the appropriate chip select signal is driven active (FIG. 4, time 274).

However, the present invention provides a method and apparatus for asserting the initial chip select signal of a memory cycle potentially one clock cycle earlier. This method and apparatus involves the logic block 250 which monitors the SAMEROW and SAMEBANK signals and one or more of the "safe" indicator signals, in order to determine whether the EARLY_CS signal can be asserted in T1 despite the fact that the command that is to be issue is not yet known. Thus, during the clock in which REQ is asserted, the FSM block 232 controls the mux 252, by way of the FSM_EN signal on signal line 256, causing the EARLY_CS signal to be driven on signal line 258. During the second and subsequent clocks after a bus cycle is initiated (depending on the cycle), the FSM block 232 controls the mux 252, by toggling the FSM_EN signal, to provide the FSM_CS signal on signal line 258, thereby shifting the responsibility to control the chip select signal to the FSM block 232. In the case of a page-hit cycle, which only requires one chip select assertion, the FSM_EN signal need not be toggled since no more chip select assertions are required. In a row-miss or page-miss cycle, the FSM_EN signal is toggled.

Thus, if it is "safe" to issue a chip select, despite the fact that the command is not yet known, the EARLY_CS signal of the logic block 250 is driven on signal line 258, causing one of the inputs to the D flip-flops $238_0$–$238_7$ (depending on row outputs [7:0]) to go low before time 288. The "safe" indicators are sampled at some time after time 287, but before time 288. At time 288, the D flip-flops $238_0$–$238_7$ are clocked, causing one of the flip-flop outputs to be driven low at time 290. Before, after, or contemporaneous with time 290, a valid command is driven on the command bus (time 294). At time 296, the appropriate command on the command bus (e.g., ACTIVATE, PRECHARGE, or READ/WRITE), is strobed into the memory device. At time 298 (in T4), the first quadword of data is read from or written to the memory device. As can be seen with the present invention, a single clock of latency can be eliminated for potentially every bus cycle, depending on the status of the relevant "safe" indicator signals. A detailed discussion of the "safe" indicator signals now follows.

The cycle tracker FSMs 220 include read tracker FSMs and write tracker FSMs which track the safe completion of the data phase for the read cycles and write cycles, respectively. Read tracker FSMs commence when a READ command is issued on the command bus, while write tracker FSMs commence when a WRITE command is issued on the command bus.

The read tracker FSMs generate safe indicator signals RSSAFE, RDSAFE, RPSAFE, and RWSAFE on signal lines 222. These signals are de-asserted upon the beginning of a READ command, indicating that it is not yet safe to issue a next cycle to memory. The RSSAFE signal, when asserted, indicates that it is safe to issue another READ command to the same physical row of memory that was just accessed and read. Thus, if a READ command is to the same physical row of memory as an immediately previous READ command, the RSSAFE signal has to be asserted before logic block 250 can assert the EARLY_CS signal. The RDSAFE signal, when asserted, indicates that it is safe to issue another READ command to a different physical row of memory that was just read. This signal is generally asserted at least one clock after the RSSAFE signal is asserted to prevent contention between the two physical rows of memory, allowing the first physical row's output drivers to turn off before the second physical row's output drivers are turned on. The RPSAFE signal, when asserted, indicates that it is safe to issue a PRECHARGE command to the same row and same bank which was just read. Issuing a PRECHARGE command too soon would result in some of the last quadwords of data from the previous read to not be driven on the bus by the memory device. The RWSAFE signal, when asserted, indicates that it is safe to issue a WRITE command to any physical row of memory. That is, issuing a WRITE command too soon after a READ command may cause contention between write data from the memory controller and read data from the memory device.

The write tracker FSMs generate safe indicator signals WSRSAFE, WDRSAFE, WSWSAFE, WDWSAFE, and WPSAFE on signal lines 222. These signals are de-asserted upon the beginning of a WRITE command. The WSRSAFE signal, when asserted, indicates that it is safe to issue a READ command to the same physical row of memory which was just written to without disrupting the completion of the write cycle. The WDRSAFE signal, when asserted, indicates that it is safe to issue a READ command to a different physical row of memory than was just written. This signal is generally asserted at least one clock after the WSRSAFE signal is asserted to prevent contention between the two physical rows of memory. The WSWSAFE signal, when asserted, indicates that it is safe to issue another WRITE command to the same physical row as the previous write. In the case of a write cycle that is shorter than four quadwords of data, this signal is asserted to allow another write cycle to the same row sooner than would be possible to another row. The WDWSAFE signal, when asserted, indicates that it is safe to issue another WRITE command to a different physical row of memory than the one just written. Finally, the WPSAFE signal, when asserted, indicates that it is safe to issue a PRECHARGE command to a row which was just written, allowing the last quadword(s) of data from the previous write to complete properly.

Figure 5C:
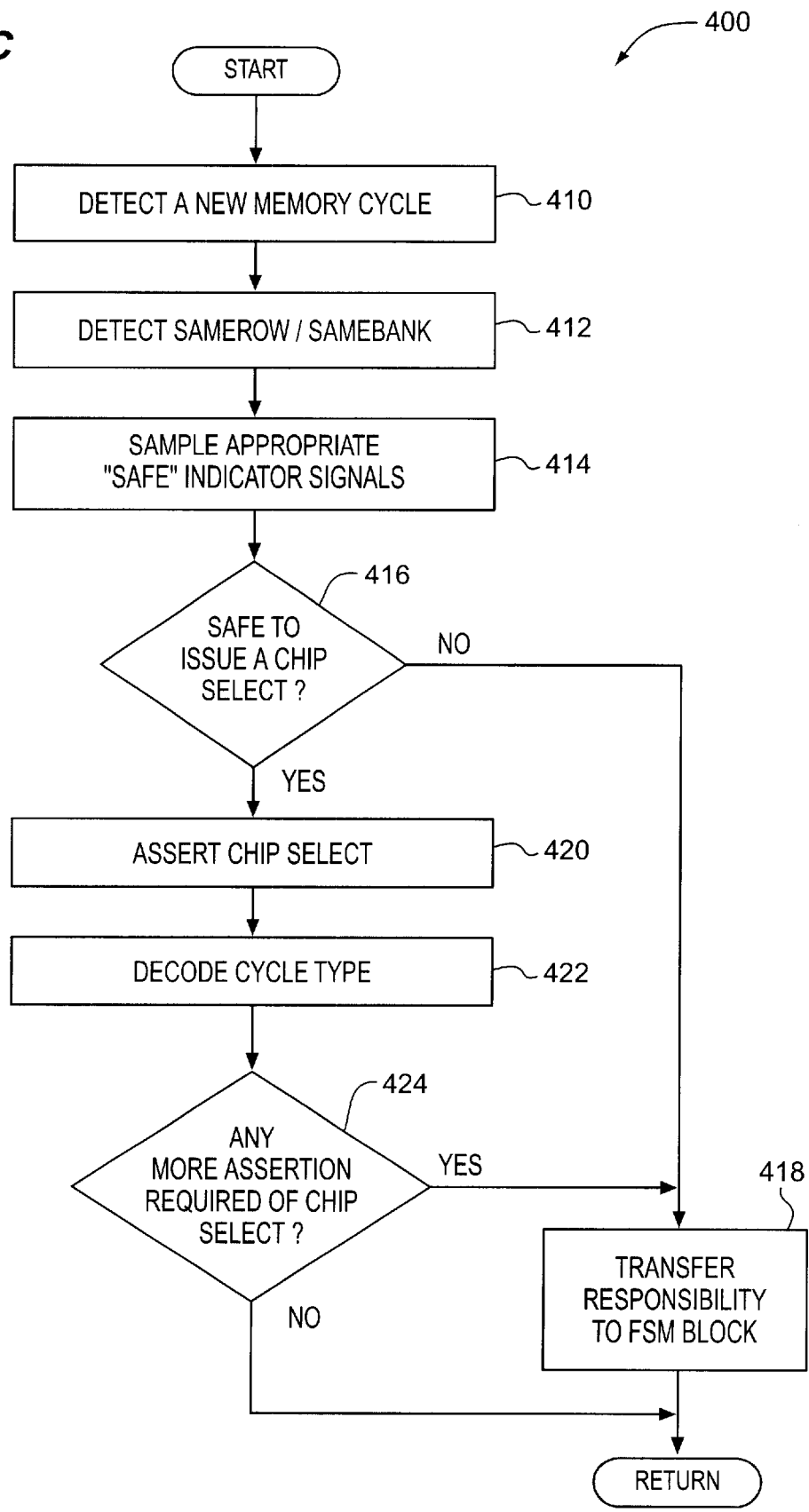
FIG. 5C is a flow diagram illustrating a process of determining whether it is safe to issue an initial chip select signal without fully decoding the cycle according to one embodiment of the present invention.

FIG. 5C is a flow diagram illustrating a process 400 of determining whether it is safe to issue an initial chip select signal without fully decoding the cycle according to one embodiment of the present invention. Referring to FIG. 5C, the process commences at block 410 where a new memory cycle is detected. At block 412 it is determined whether the new memory cycle is to the same row and/or bank as a previous memory cycle. At block 414 one or more "safe" indicator signals are samples. The process then moves to block 416, where it is determined whether it is safe to issue a chip select signal, without fully decoding the memory cycle or knowing the cycle type. If it is not "safe" to issue a chip select signal, then the process moves to block 418 where the responsibility for controlling further assertions of chip select for the balance of the memory cycle is transferred to the FSM block 232 (FIG. 4A). Then process then ends. At block 416, if it is safe to issue a chip select signal, then the chip select signal is asserted without full knowledge of the cycle type. At block 422, the memory cycle is fully decoded and the cycle type is known. At block 424, a determination is made as to whether any more chip select assertions are required. If the cycle type is a page-hit, then no further chip select assertions are required and the process ends. However, if the cycle type is a row-miss or a page-miss, then one or more chip select assertions are required, and the process moves to block 418 to transfer the responsibility to the FSM block.

Figure 6A:
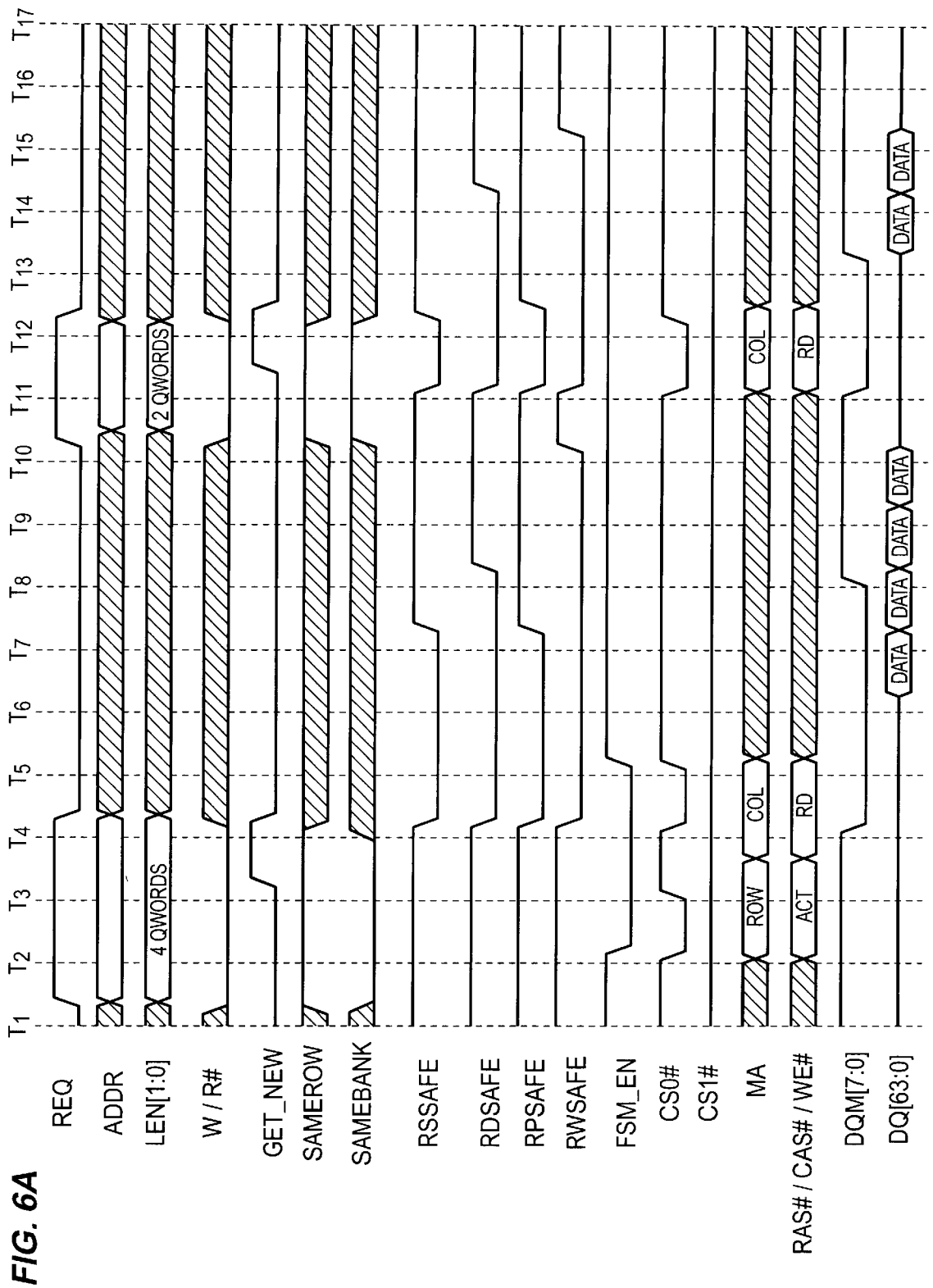
FIG. 6A illustrates a timing diagram of the internal and external signals of the memory controller for performing two read cycles to the same physical row of memory.

FIG. 6A illustrates a timing diagram of the internal and external signals of the memory controller 300 for performing two read cycles to the same physical row of memory. In this illustration, it is assumed that the interface device 118 (FIG. 1) is responsible for generating the REQ, ADDR, LEN[1:0], and W/R# signals to the memory controller 116, while the memory controller 116 generates the GET_NEW signal to the interface device 118. The LEN[1:0] signals indicate the number of quadwords of data to be written to or read from memory (e.g., 1, 2, or 4 quadwords of data), while the GET_NEW signal indicates that the memory controller 116 is ready for a new cycle. Referring to FIGS. 5A and 6A, the first cycle is initiated by the assertion of REQ in T1. At about the same time as REQ is asserted, a valid address is driven on the ADDR bus, a valid length is driven on the LEN signal lines (four quadwords), and the W/R# signal indicates a read cycle. The SAMEROW and SAMEBANK output signals become valid in T1. SAMEROW is high while SAMEBANK is low, indicating that the cycle is to the same row, but different bank than the last cycle (which turns out not to have a page open). In T1, all the read safe indicators are asserted indicating that the last read cycle was long enough ago that it is now safe (from the perspective of the last read cycle) to issue a CS# for any command. It is important to note that the write tracker safe indicator signals also need to be checked for this cycle since the last cycle could have been a write cycle. In this case, it is assumed that the last write cycle was long enough ago that all the write tracker safe indicator signals are asserted.

Thus, before the beginning of T2, the EARLY_CS signal on signal line 254 is asserted (and ROW0 is also asserted) causing the input to D flip-flop $238_0$ to be low. In T2, CS0# is driven low, an ACTIVATE command is driven on the command bus, and a row address is driven on the MA bus. Also in T2 the FSM_EN signal goes low, transferring the responsibility to assert the chip select enable signal for the remainder of the cycle to the FSM block 232. In T3, the memory controller 116 asserts the GET_NEW signal to indicate to the interface device 118 that it can accept another cycle. In T3 or T4, the READ command is driven on the command bus and the column address is driven on the MA bus. However, the READ command is not sampled until T5 (rising edge), which is when CS0# is sampled to be asserted. From T6 to T9, four quadwords of data are driven on the DQ bus for consumption at clocks T7 to T10.

In T4, the read "safe" indicator signals are all de-asserted (low). They are then asserted again when their designated functions become safe, which may at different points in time. For instance, the RWSAFE signal is de-asserted for the longest time (T10), to prevent bus contention with the memory device which is driving data on the DQ bus from T6 to T10. However, the RWSAFE signal is only relevant if the next cycle is a write.

If a new read cycle was driven to the memory controller 116 in clock 8 (i.e., REQ asserted), a chip select assertion in clock 9 is definite because the read safe indicator signals RSSAFE, RDSAFE, and RWSAFE all indicate that it is safe to issue a command in clock 9. If a new read cycle was driven to the memory controller 116 in clock 7, a chip select assertion in clock 8 would result only if the cycle was to the same row. If the cycle were to a different row, then chip select assertion would not result until clock 9 since RDSAFE is not active until T8.

In T10, a second read cycle is issued requesting two quadwords of data. In T10, all safe indicators are asserted, indicating that a chip select assertion is definite in T11. The second read cycle causes a page-hit, indicating only one chip select assertion, in which case the FSM_EN signal does not transition. Moreover, since the second read cycle only requests two quadwords of data, the safe indicator signals are de-asserted for a shorter time, indicating that a third cycle can be initiated sooner. Thus, in this illustration, the present invention reduced the latency by two clock cycles.

Figure 6B:
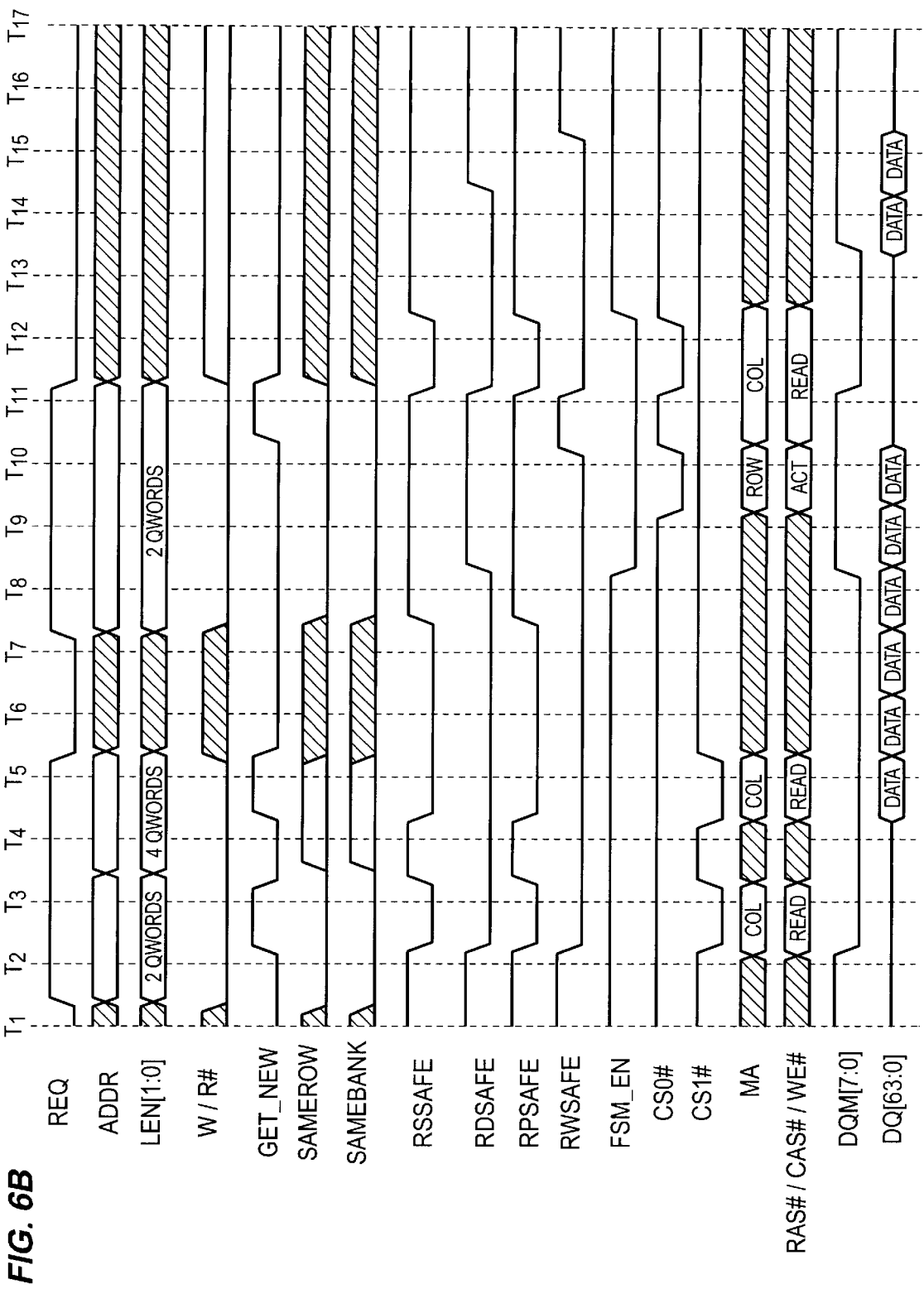
FIG. 6B illustrates a timing diagram of the internal and external signals of the memory controller for performing three read cycles.

FIG. 6B illustrates a timing diagram of the internal and external signals of the memory controller 300 for performing three read cycles. Referring to FIGS. 5A and 6B, REQ is asserted in T1 where the first cycle is a read cycle requesting two quadwords of data. Again, all the read safe indicators are asserted in T1 indicating that the last read cycle was long enough ago that it is now safe (from the perspective of the last read cycle) to issue a CS# for any command. It is important to note that the write tracker safe indicator signals also need to be checked for this cycle since the last cycle could have been a write cycle. In this case, it is assumed that the last write cycle was long enough ago that all the write tracker safe indicator signals are asserted. Therefore, CS1# is asserted in T2. This first cycle turns out to be a page-hit and result in only a READ command.

The memory controller 116 asserts GET_NEW in T2, and the interface device 118 maintains REQ asserted even after the interface device 118 samples the GET_NEW signal indicating another immediate cycle request in T3. This second cycle is a read for four quadwords of data. The SAMEROW and SAMEBANK signals are asserted in T3, indicating that the second read cycle is to the same row and bank as the last cycle. Therefore, only the RSSAFE and RPSAFE signals must be checked. They are both asserted in T3 allowing CS1# assertion in T4. The second read cycle again turns out to be a page-hit. Thus, the first and second cycles each provided a performance advantage of two clocks. Two clocks are saved by the early assertion of the CS1# signal.

In T4, the memory controller 116 asserts GET_NEW requesting another cycle. In T7, the interface device 118 asserts the REQ signal to initiate a third cycle. This third cycle is for two quadwords, but indicates that it is directed to a different physical row of memory (SAMEROW is low). As a result, the RDSAFE signal is checked in T7 to see if it is safe to issue a command in T8. However, the RDSAFE signal is inactive. Thus, not knowing the cycle type (page-hit, page-miss, row-miss), the memory controller 116 cannot safely drive the CS# signal low in T8. In T8, the cycle type is available, and the responsibility to assert CS# is transferred to the FSM block 232, as indicated by FSM_EN going low. In T8, it is determined that the cycle is a row-miss, resulting in an ACTIVATE command followed by a READ command. Note in hindsight, however, that it would have been safe to drive the ACTIVATE command in T8. This information was not known in T7, so CS# assertion in T8, when viewed in T7, was not completely safe, even though it was determined safe after the fact. In this third cycle, the latency is the same as for the prior art.

As thus described, the present invention provides a method and apparatus for reducing the latency of a cycle initiated by a bus-mastering agent or device to memory. For example, the Pentium® II processor can, at best, receive read data within seven clock cycles for the first data returned. This speed can be considered zero wait states. The present invention allows the Pentium® II processor to reach the maximum possible read performance. The present invention also improves the performance of write cycles, allowing them to be completed with minimal latency, freeing the memory interface for other cycles. This provides a performance boost, especially with memory intensive applications.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A memory controller method, comprising:
receiving a memory request;
partially decoding the memory request;
sampling one or more safe indicator signals;
causing a chip select signal to be asserted without knowing a cycle type of the memory request, responsive to the partial decode and the one or more safe indicator signals, wherein causing the chip select signal to be asserted comprises causing the chip select signal to be asserted, by a first device;
determining the cycle type; and
switching a responsibility to further assert the chip select signal within the memory request to a second device, wherein switching the responsibility comprises switching the responsibility to further assert the chip select signal within the memory request to a second device responsive to determining the cycle type.

2. A memory controller method, comprising:
receiving a memory request;
partially decoding the memory request;
sampling one or more safe indicator signals; and
causing a chip select signal to be asserted without knowing a cycle type of the memory request, responsive to the partial decode and the one or more safe indicator signals, wherein partially decoding the memory request comprises:
determining a row and bank that is addressed in the memory request;
comparing the row and bank with a row and bank that was addressed in a previous memory request; and
determining whether a same row and a same bank is addressed in the memory request, responsive to comparing.

3. A memory controller method, comprising:
receiving a memory request, wherein receiving the memory request comprises receiving a memory request in a first clock cycle;
partially decoding the memory request, wherein partially decoding the memory request comprises partially decoding the memory request in the first clock cycle;
sampling one or more safe indicator signals, wherein sampling the one or more safe indicator signals comprises sampling one or more safe indicator signals in the first clock cycle; and
causing a chip select signal to be asserted without knowing a cycle type of the memory request, responsive to the partial decode and the one or more safe indicator signals, wherein causing the chip select signal to be asserted comprises causing the chip select signal to be asserted in a second clock cycle without knowing the cycle type of the memory request, responsive to the partial decode and the one or more safe indicator signals.

4. A memory controller method, comprising:
receiving a memory cycle;
partially decoding the memory cycle;
sampling one or more safe indicator signals; and
driving a chip select signal without fully decoding the memory cycle, responsive to the partial decode of the memory cycle and the one or more safe indicator signals, wherein driving the chip select signal comprises driving the chip select signal by a first device;
determining the cycle type;
switching a responsibility to further assert the chip select signal within the memory request to a second device, wherein switching the responsibility comprises switching the responsibility to further assert the chip select signal within the memory request to a second device responsive to determining the cycle type.

5. A memory controller method, comprising:
receiving a memory cycle;
partially decoding the memory cycle;
sampling one or more safe indicator signals; and
driving a chip select signal without fully decoding the memory cycle, responsive to the partial decode of the memory cycle and the one or more safe indicator signals, wherein driving the chip select signal comprises driving the chip select signal by a first device and wherein partially decoding the memory request comprises:

determining a row and bank that is addressed in the memory request;
comparing the row and bank with a row and bank that was addressed in a previous memory request; and
determining whether a same row and a same bank is addressed in the memory request, responsive to comparing.

6. A memory controller, comprising:
a decode unit to receive an address of a memory cycle, and generate first and second sets of signals, the first set of signals providing a partial decode of the memory cycle;
a cycle tracker circuit to monitor completion of memory cycles and to generate one or more safe indicator signals;
a first circuit coupled to receive the first set of signals and the one or more safe indicator signals, the first circuit to cause an initial assertion of a chip select signal in response to the first set of signals and the one or more safe indicator signals; and
a chip-sclect circuit to receive the first and second sets of signals, said chip-select circuit to control further assertions of the chip select signal, if any.

7. The memory controller method of claim 6 wherein the first set of signals comprises a samerow signal and a samebank signal.

8. The memory controller method of claim 6 wherein the second of signals comprises a page-hit, page-miss, and row-miss signals.

9. The memory controller method of claim 6 wherein the decode unit comprises: a
first decoder which receives the address of the memory cycle and generates row and bank outputs;
a second decoder coupled to the first decoder, said second decoder to compare the row and bank outputs and generate the first set of signals; and
a third decoder coupled to the first decoder, said third decoder to generate the second set of signals.

10. A system comprising:
a memory device; and
a memory controller coupled to the memory array, the memory controller including
a decode unit to receive an address of a memory cycle, and generate first and second sets of signals, the first set of signals providing a partial decode of the memory cycle,
a cycle tracker circuit to monitor completion of memory cycles and to generate one or more safe indicator signals,
a first circuit to receive the first set of signals and the one or more safe indicator signals, the first circuit to cause an initial assertion of a chip select signal to the memory device in response to the first set of signals and the one or more safe indicator signals, and
a chip-select circuit to receive the first and second sets of signals, said chip-select circuit to control further assertions of the chip select signal, if any, to the memory device.

11. The system of claim 10 further comprising a microprocessor coupled to the memory controller, the microprocessor to initiate memory cycles to the memory controller.

12. A machine-readable medium having stored thereon data representing sequences of instructions, the sequences of instructions which, when executed by a processor, cause the processor to:
receive a memory request;
partially decode the memory request;
sample one or more safe indicator signals;
cause a chip select signal to be asserted without knowing a cycle type of the memory request, responsive to the partial decode and the one or more safe indicator signals wherein causing the chip select signal to be asserted further comprises instructions that cause the chip select signal to be asserted, by a first device;
determine the cycle type; and
switch a responsibility to further assert the chip select signal within the memory request to a second device, wherein the sequence of instruction that causes the processor to switch the responsibility further comprises instructions that cause the processor to switch the responsibility to further assert the chip select signal within the memory request to a second device responsive to determining the cycle type.

13. A machine-readable medium having stored thereon data representing sequences of instructions, the sequences of instructions which, when executed by a processor, cause the processor to:
receive a memory request;
partially decode the memory request;
sample one or more safe indicator signals; and
cause a chip select signal to be asserted without knowing a cycle type of the memory request, responsive to the partial decode and the one or more safe indicator signals, wherein the instruction to partially decode the memory request further comprises instructions to:
determine a row and bank that is addressed in the memory request;
compare the row and bank with a row and bank that was addressed in a previous memory request; and
determine whether a same row and a same bank is addressed in the memory request, responsive to comparing.

14. A machine-readable medium having stored thereon data representing sequences of instructions, the sequences of instructions which, when executed by a processor, cause the processor to:
receive a memory request, wherein the instruction to receive the memory request further comprises instructions to receive a memory request in a first clock cycle;
partially decode the memory request, wherein the instructions to partially decode the memory request comprises instructions to partially decode the memory request in the first clock cycle;
sample one or more safe indicator signals, wherein the instructions to sample the one or more safe indicator signals further comprises instructions to sample one or more safe indicator signals in the first clock cycle; and
cause a chip select signal to be asserted without knowing a cycle type of the memory request, responsive to the partial decode and the one or more safe indicator signals, wherein the instructions to cause the chip select signal to be asserted further comprises instructions to cause the chip select signal to be asserted in a second clock cycle without knowing the cycle type of the memory request, responsive to the partial decode and the one or more safe indicator signals.

15. A machine readable medium having stored thereon data representing sequences of instructions, the sequences of instructions which, when executed by a processor, cause the processor to:

receive a memory cycle;
partially decode the memory cycle;
sample one or more safe indicator signals;
drive a chip select signal without fully decoding the memory cycle, responsive to the partial decode of the memory cycle and the one or more safe indicator signals, wherein the sequence of instructions to drive the chip select signal further comprises instructions to drive the chip select signal by a first device; determine the cycle type; and
switch a responsibility to further assert the chip select signal within the memory request to a second device, wherein the sequences of instructions to switch the responsibility further comprises sequences of instructions causing the processor to switch the responsibility to further assert the chip select signal within the memory request to a second device responsive to determining the cycle type.

16. A machine readable medium having stored thereon data representing sequences of instructions, the sequences of instructions which, when executed by a processor, cause the processor to:

receive a memory cycle;

partially decode the memory cycle;

sample one or more safe indicator signals; and drive a chip select signal without fully decoding the memory cycle, responsive to the partial decode of the memory cycle and the one or more safe indicator signals, wherein the sequences of instructions to partially decode the memory request further comprises sequences of instructions causing the processor to:

determine a row and bank that is addressed in the memory request;

compare the row and bank with a row and bank that was addressed in a previous memory request; and determine whether a same row and a same bank is addressed in the memory request, responsive to comparing.

* * * * *